US008372270B2

(12) United States Patent
Nguyen et al.

(10) Patent No.: US 8,372,270 B2
(45) Date of Patent: Feb. 12, 2013

(54) ADDITIVES TO ENHANCE METAL REMOVAL IN REFINERY DESALTING PROCESSES

(75) Inventors: Tran M. Nguyen, Houston, TX (US); Jerry J. Weers, Richmond, TX (US); Jianzhong Yang, Missouri City, TX (US); Ksenija Babic, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 44 days.

(21) Appl. No.: 13/008,667

(22) Filed: Jan. 18, 2011

(65) Prior Publication Data

US 2011/0172473 A1 Jul. 14, 2011

Related U.S. Application Data

(60) Continuation-in-part of application No. 12/390,631, filed on Feb. 23, 2009, which is a division of application No. 10/649,921, filed on Aug. 27, 2003, now Pat. No. 7,497,943.

(60) Provisional application No. 60/407,139, filed on Aug. 30, 2002.

(51) Int. Cl.
*C10G 17/04* (2006.01)
*C10G 33/04* (2006.01)

(52) U.S. Cl. ............... 208/251 R; 208/252; 208/290; 208/291

(58) Field of Classification Search .......... 208/251 R, 208/252, 290, 291
See application file for complete search history.

(56) References Cited

U.S. PATENT DOCUMENTS

| | | |
|---|---|---|
| 2,175,095 A | 10/1939 | Stoesser |
| 2,355,077 A | 8/1944 | Johnson |
| 2,744,853 A | 5/1956 | Kavanagh et al. |
| 2,767,123 A | 10/1956 | Hickok et al. |
| 2,778,777 A | 1/1957 | Powell |
| 3,023,160 A | 2/1962 | Stedman |
| 3,150,081 A | 9/1964 | Haslam |
| 3,167,500 A | 1/1965 | Payne |
| 3,322,664 A | 5/1967 | Paterson et al. |
| 3,449,243 A | 6/1969 | Strong, Jr. et al. |
| 3,582,489 A | 6/1971 | Meadow et al. |
| 3,617,571 A * | 11/1971 | Mange et al. ............... 516/191 |
| 4,164,472 A | 8/1979 | Cheng et al. |
| 4,167,214 A | 9/1979 | Street, Jr. |
| 4,276,185 A | 6/1981 | Martin |
| 4,342,657 A | 8/1982 | Blair, Jr. |
| 4,432,865 A | 2/1984 | Norman |
| 4,439,345 A | 3/1984 | Duke |
| 4,587,005 A | 5/1986 | Siskin et al. |
| 4,645,589 A | 2/1987 | Krambeck et al. |
| 4,778,589 A | 10/1988 | Reynolds |
| 4,778,590 A | 10/1988 | Reynolds et al. |
| 4,778,591 A | 10/1988 | Reynolds |
| 4,778,592 A | 10/1988 | Reynolds |
| 4,785,463 A | 11/1988 | Janc et al. |
| 4,789,463 A | 12/1988 | Reynolds |
| 4,818,410 A | 4/1989 | Bellos et al. |
| 4,853,109 A | 8/1989 | Reynolds |
| 4,938,876 A | 7/1990 | Ohsol |
| 4,988,433 A | 1/1991 | Reynolds et al. |
| 4,992,210 A | 2/1991 | Naeger et al. |
| 5,062,992 A | 11/1991 | McCullough |
| 5,078,858 A | 1/1992 | Hart et al. |
| 5,080,779 A | 1/1992 | Awbrey et al. |
| 5,104,578 A | 4/1992 | McCullough |
| 5,114,566 A | 5/1992 | Naeger et al. |
| 5,174,957 A | 12/1992 | McCullough |
| 5,176,847 A | 1/1993 | Kremer |
| 5,282,959 A | 2/1994 | Roling et al. |
| 5,346,627 A | 9/1994 | Siefert et al. |
| 5,364,532 A | 11/1994 | Bellos et al. |
| 5,389,594 A | 2/1995 | Crump et al. |
| 5,395,536 A | 3/1995 | Brown et al. |
| 5,637,223 A | 6/1997 | Bellos et al. |
| 5,853,592 A | 12/1998 | Bellos et al. |
| 5,948,242 A | 9/1999 | Ohsol et al. |
| 6,039,865 A | 3/2000 | Mesher |
| 6,133,205 A | 10/2000 | Jones |
| 7,497,943 B2 | 3/2009 | Nguyen et al. |

FOREIGN PATENT DOCUMENTS

| | | |
|---|---|---|
| JP | S421992 | 1/1967 |
| JP | S6032888 | 2/1985 |
| RU | 1666520 A1 | 8/1989 |
| WO | 0052114 A1 | 9/2000 |
| WO | 0140410 A1 | 6/2001 |

OTHER PUBLICATIONS

J.H. Gary, et al., Petroleum Refining: Technology and Economics, 3rd Edition, Chapter 4, Crude Distillation, 1994, pp. 39-69, Marcel Dekker, Inc., New York.
PCT International Search Report for International Application No. PCT/US02/27116, Dec. 23, 2003.
J. Weers, et al., "A New Metals Removal Process for Doba Crude Oil," ERTC 9th Annual Meeting, Prague, Czech Republic, Nov. 15, 2004.
J.J. Weers et al., "Calcium Removal from High TAN Crudes," Petroleum Technology Quarterly, Q3, 2005, avilalbe from www.eptq.com.

(Continued)

*Primary Examiner* — Walter D Griffin
*Assistant Examiner* — Renee E Robinson
(74) *Attorney, Agent, or Firm* — Mossman Kumar & Tyler PC

(57) ABSTRACT

It has been discovered that metals can be removed or transferred from a hydrocarbon phase to a water phase in an emulsion breaking process by using a composition that contains a demulsifier (for instance, an oxyalkylated alkyl resin and/or a crosslinked polypropylene glycol), a surfactant, a diketone and a solvent (for instance an aromatic solvent). The method may also include introducing a hydroxyl carboxylic acid and/or at least one mineral acid to reduce the pH of the desalter wash water. The method permits transfer of metals into the aqueous phase with little or no hydrocarbon phase undercarry into the aqueous phase. The composition is particularly useful in treating crude oil emulsions, and in removing iron therefrom.

19 Claims, No Drawings

OTHER PUBLICATIONS

Baker Petrolite, "Remove Metals, Improve Margins," EXCALIBUR brochure, 2005.
Plaintiff's First Amended Complaint and Application for Preliminary Injunction.
Defendant Nalco company's Response to Plaintiff's Application for a Preliminary Injunction.
Plaintiff's Reply to Defendant Nalco Company's Response to Plaintiff's Application for Preliminary Injunction.
Nalco Company's Second Amended Answer to First Amended Complaint.
Amended Memorandum Opinion and Order for Injunctive Relief.
Plaintiff's Answer to Defendant's Second Amended Counterclaims.

* cited by examiner

ADDITIVES TO ENHANCE METAL REMOVAL IN REFINERY DESALTING PROCESSES

CROSS-REFERENCE TO RELATED APPLICATIONS

This application is continuation-in-part application of U.S. patent application Ser. No. 12/390,631 filed Feb. 23, 2009, which is a divisional application of U.S. patent application Ser. No. 10/649,921 filed Aug. 27, 2003, issued as U.S. Pat. No. 7,497,943 on Mar. 3, 2009, which in turn claims the benefit of U.S. Provisional Application No. 60/407,139 filed Aug. 30, 2002.

TECHNICAL FIELD

The present invention relates to methods and compositions for separating emulsions of hydrocarbons and water, and more particularly relates, in one embodiment, to methods and compositions for transferring metals, such as iron metal and iron-containing complexes and compounds, to an aqueous phase in an emulsion breaking process.

BACKGROUND

In an oil refinery, the desalting of crude oil has been practiced for many years. The crude is usually contaminated from several sources, including, but not necessarily limited to:

Brine contamination in the crude oil as a result of the brine associated with the oil in the ground;

Minerals, clay, silt, and sand from the formation around the oil well bore;

Metals including calcium, zinc, silicon, nickel, sodium, potassium, etc.;

Nitrogen-containing compounds such as amines used to scrub $H_2S$ from refinery gas streams in amine units, or from amines used as neutralizers in crude unit overhead systems, and also from $H_2S$ scavengers used in the oilfield; and Iron sulfides and iron oxides resulting from pipeline and vessel corrosion during production, transport, and storage.

Desalting is necessary prior to further processing to remove these salts and other inorganic materials that would otherwise cause fouling and deposits in downstream heat exchanger equipment and/or form corrosive salts detrimental to crude oil processing equipment. Further, these metals can act as poisons for the catalysts used in downstream refinery units. Effective crude oil desalting can help minimize the effects of these contaminants on the crude unit and downstream operations. Proper desalter operations provide the following benefits to the refiner:

Reduced crude unit corrosion.
Reduced crude preheat system fouling.
Reduced potential for distillation column damage.
Reduced energy costs.
Reduced downstream process and product contamination.

Desalting is the resolution of the natural emulsion of water that accompanies the crude oil by creating another emulsion in which about 2 to about 10 wt % percent relative wash water is dispersed into the oil using a mix valve. For lighter crudes, the wash water proportion may range from about 3 to about 5 wt %; for heavier (lower gravity) crudes, the wash water proportion may range from about 5 to about 8 wt %. The emulsion mix is directed into a desalter vessel containing a parallel series of electrically charged plates. Under this arrangement, the oil and water emulsion is exposed to the applied electrical field. An induced dipole is formed on each water droplet within the emulsion that causes electrostatic attraction and coalescence of the water droplets into larger and larger droplets. Eventually, the emulsion resolves into two separate phases—the oil phase (top layer) and the water phase (bottom layer). The streams of desalted crude oil and effluent water are separately discharged from the desalter.

The entire desalting process is a continuous flow procedure as opposed to a batch process. Normally, chemical additives are injected before the mix valve to help resolve the oil/water emulsion in addition to the use of electrostatic coalescence, although some additives or portions of additives may be injected elsewhere. These additives effectively allow small water droplets to more easily coalesce by lowering the oil/water interfacial tension.

Crude oil that contains a high percent of particulate solids can complicate the desalting process. The particulate solids, by nature, would prefer to transfer to the water phase. However, much of the solids in a crude oil from a field exists in tight water-in-oil emulsions. That is, oil-wetted solids in high concentration in the crude may help form tight oil and water emulsions that are difficult to resolve. These tight emulsions are often referred to as "rag" and may exist as a layer between the separated oil and water phases. The rag layer inside the desalter vessel may grow to such an extent that some of it will be inadvertently discharged with the water phase. This is a problem for the waste water treatment plant since the rag layer still contains a high percentage of unresolved emulsified oil.

As mentioned, much of the solids encountered during crude oil desalting consists of iron, most commonly as particulate iron such as iron oxide, iron sulfide, etc. Other metals that are desirably removed include, but are not necessarily limited to, calcium, zinc, silicon, nickel, sodium, potassium, and the like, and typically a number of these metals are present. Some of the metals may be present in a soluble form. The metals may be present in inorganic or organic forms. In addition to complicating the desalter operation, iron and other metals are of particular concern to further downstream processing. This includes the coking operation since iron and other metals remaining in the processed hydrocarbon yields a lower grade of coke. Removing the metals from the crude oil early in the hydrocarbon processing stages is desired to eventually yield high quality coke as well as to limit corrosion and fouling processing problems.

Several treatment approaches have been made to reduce total metal levels and these all center on the removal of metals at the desalter unit. Normally, the desalter only removes water soluble inorganic salts such as sodium or potassium chlorides. Some crude oils contain water insoluble metal organic acid salts such as iron naphthenate and calcium naphthenate, which are soluble or dispersed as fine particulate matter in the oil but not in water.

It would thus be desirable to develop a composition and method employing it that would cause most or all of the metals in the crude oil to transfer from the oil phase to the aqueous phase in a desalter operation, with little or no oil carry-under in the aqueous phase.

SUMMARY

There is provided, in one non-restrictive form, a method of transferring at least one metal from a hydrocarbon phase to a water phase in a refinery desalting process. The method includes adding to crude oil, an effective amount of a composition to transfer at least one metal from a hydrocarbon phase to a water phase. The composition includes at least one demulsifier selected from the group consisting of an oxyalkylated alkyl resin, a crosslinked polypropylene glycol and mixtures thereof, at least one surfactant, at least one diketone chelating agent and at least one solvent. The method further includes adding wash water to the crude oil to create an emulsion. The above procedures are not necessarily performed in that order, but may be in a different order or conducted simultaneously. The method also involves resolving the emulsion into a hydrocarbon phase and an aqueous phase using electrostatic coalescence, where at least a portion of the at least one metal is transferred to the aqueous phase.

Typically, the crude oil and water are heated before being mixed in the mix valve and entering the desalter vessel. Heat changes the viscosity of the oil which helps let the water droplets settle in the desalter. The temperature of the crude oil and water typically range from about 40 independently to about 205° C.; alternatively, from about 82 independently to about 177° C.

In another non-limiting embodiment, there is provided a composition for transferring at least one metal from a hydrocarbon phase to a water phase, where the composition comprising a blend that includes at least one demulsifier, at least one surfactant, at least one diketone chelating agent and at least one solvent.

There is also provided in another non-limiting embodiment a treated crude oil emulsion that includes crude oil, wash water and a composition for transferring at least one metal from a hydrocarbon phase to a water phase. The composition again comprises a blend which includes at least one demulsifier, at least one surfactant, at least one diketone and at least one solvent.

DETAILED DESCRIPTION

It has been discovered that the addition of a composition having a particular complex blend to a hydrocarbon stream can significantly reduce the amount of iron and other metals in the hydrocarbon, such as crude oil, when it is run through a desalter in a refinery. More specifically, methods and compositions are described for removing metal contaminants, particularly iron, and more particularly non-porphyrin forms of iron, particularly in petroleum crude oil or residual crude oil (resid), to an aqueous phase in an emulsion breaking process. The addition of the complex blends in levels of up to 2000 ppm-w, results in much lower metals content of the desalted oil. The levels of metals other than iron such as calcium, magnesium, copper, vanadium, zinc, silicon, nickel, sodium and potassium may also be reduced. The removal of particulate iron in the form of iron oxide, iron sulfide, etc. is a specific, non-limiting embodiment of the method. By "removing" the metals from the hydrocarbon or crude is meant any and all partitioning, sequestering, separating, transferring, eliminating, dividing, removing, of one or more metal from the hydrocarbon or crude to any extent.

Being a non-aqueous additive, the complex blend is typically added to the hydrocarbon or crude oil stream prior to the desalter, when the method involves a desalting operation. This improves distribution of the blend in the oil although addition to the crude oil should not be viewed as a requirement for the blend of the described herein to work.

The composition and method herein will be valuable to produce high quality (i.e., high purity) coke from crude that may originally have contained high concentrations of metals and solids, including iron-based solids. Further, the complex blend and method of using it advances the technology by removing inorganic material from the crude oil without discharging any oil or emulsion to the waste treatment plant.

In this method, it will be understood that the metals include, but are not necessarily limited to, those of Groups IA, IIA, VB, VIII, IIB and IVA of the Periodic Table (CAS version). In another non-limiting embodiment, the metals include, but are not necessarily limited to iron, calcium, zinc, silicon, nickel, sodium, potassium, vanadium, and combinations thereof. In particular, nickel and vanadium are known poisons for catalysts used in fluid catalytic cracking units (FCCUs) downstream and thus it is useful to remove them at the desalting stage.

In one embodiment, the complex blend includes at least one each of four components: an oxyalkylated alkyl resin, a crosslinked polypropylene glycol, a surfactant and a diketone.

A suitable oxyalkylated alkyl resin may include, but are not necessarily limited to, t-butyl phenol resins, octyl phenol resins, nonyl phenol resins, dinonyl phenol resins, dodecyl phenol resins, and combinations thereof, which resin has been ethoxylated and/or propoxylated. It should be understood that this definition of oxyalkylated alkyl resins includes phenols substituted with two and three alkyl groups, such as those in the compounds noted above. That is, di-substituted and trisubstituted phenols are encompassed, such as dinonyl phenol. It should also be understood that this resin definition includes the reaction products of blends of two or three phenols added together (in a non-limiting example, t-butyl phenol, nonyl phenol and dinonylphenol) and then reacting this mixture with formaldehyde. The different ratios of the various phenols give the resulting random polymer different properties, such as oil solubility, that can improve performance over a resin with a single type of phenol. Suitable oxyalkylated alkyl resins also include phenol resins bearing all of the alkyl groups previously noted. As mentioned, the oxyalkylation portion of the alkyl resin is expected to most commonly be ethoxy and/or propoxy, although butoxylated resins are also expected to be useful; which may be optionally additionally ethoxylated and/or propoxylated. The alkyl group may be linear, branched, and/or cyclic alkyl having from 1 to 50 carbon atoms, and in a non limiting embodiment having 1 to 30 carbon atoms. If not we should add language covering the possibility of multiple alkyl groups.

The demulsifier may also alternatively or additionally include crosslinked polypropylene glycols which may be crosslinked with any suitable crosslinking agents. Suitable crosslinking agents include, but are not necessarily limited to, bisphenol A, epoxy resins, anhydrides, toluene diisocyanate, and combinations thereof. One non-limiting example of suitable epoxy resins includes EPON® epoxy resins available from Shell Chemicals.

Suitable surfactants include, but are not necessarily limited to, $C_1$-$C_{30}$ ethoxylated fatty acids, oxyalkylated alkyl phenols different from the at least one oxyalkylated alkyl resin (if present), polyoxyethylene glycol sorbitan alkyl esters, sorbitan alkyl esters, glucoside alkyl ethers, and combinations thereof.

Suitable diketone chelating agents include, but are not necessarily limited to, 2,3-butanedione, diacetyl diketone, acetylacetone, hexane-2,5-dione, and combinations thereof.

In one non-limiting embodiment, the proportions of the various components in the complex blend, based on the total blend include the demulsifier proportion ranging from about 1 independently to about 50 weight %, the surfactant proportion ranging from about 1 independently to about 20 weight %, and the diketone proportion ranging from about 1 independently to about 30 weight %. Alternatively, the demulsifier proportion ranges from about 10 independently to about 30 weight %, the surfactant proportion ranges from about 5 independently to about 15 weight %, and the diketone proportion ranges from about 5 independently to about 20 weight %. By "independently" as used with respect to a range herein, any lower threshold may be combined with any upper threshold for the same parameter to provide an acceptable alternate range.

If both an oxyalkylated alkyl resin and a crosslinked polypropylene glycol are used in the demulsifier, the amount of oxyalkylated alkyl resin in the total complex blend may range from about 5 independently to about 50 wt %, alternatively 10 independently to about 30 wt %; and the amount of crosslinked polypropylene glycol may range from about 1 independently to about 30 wt %, alternatively from about 10 independently to about 20 wt %.

The complex additive blend described herein may be injected or otherwise introduced into the hydrocarbon stream, e.g. crude oil, before the mix valve in neat form or diluted with a solvent suitable to keep all blend components in solution. The composition containing the complex blend may contain a solvent ranging from about 5 independently to about 90 vol %, based on the total composition, and alternatively from about 30 to about 50 wt. %. In one non-limiting embodiment suitable solvents include, but are not limited to, aromatic solvents such as Aromatic 100 or the like, as well as naphtha, xylene, cumene, trimethylbenzene and the like.

It is expected that the complex blends will be used together with other additives including, but not necessarily limited to, corrosion inhibitors, demulsifiers, pH adjusters, metal chelants, scale inhibitors, hydrocarbon solvents, and mixtures thereof, in a commercial process. Metal chelants are compounds that complex with metals to form chelates. In some non-limiting versions, the acids that will be described may function as chelation agents, but the method herein is not limited to any particular mechanism. In particular, hydroxyl carboxylic acids and mineral acids may be used since metal removal is best accomplished at an acidic pH. The use of combinations of hydroxyl carboxylic acids, particularly glycolic acid or gluconic acid, and mineral acids may give the best economics in a commercial application. Suitable mineral acids for use in conjunction with the hydroxyl carboxylic acids may include, but are not necessarily limited to, sulfuric acid, phosphoric acid, water-soluble sulfonic acids, water-soluble phosphonic acids, and combinations thereof. Suitable water-soluble sulfonic acids include, but are not necessarily limited to, methylsulfonic acid, toluene sulfonic acid and the like and mixtures thereof. Suitable water-soluble phosphonic acids, also known as phosphonates, include, but are not necessarily limited to, 2-hydroxyphosphonocarboxylic acid, amino trimethylene phosphonic acid, 1-hydroxy ethylidene-1,1-diphosphonic acid, and the like and mixtures thereof.

As noted, in one non-restrictive embodiment, the method is practiced in a refinery desalting process that involves washing the crude emulsion with wash water. In one non-limiting embodiment, the amount of hydroxyl carboxylic acid and/or mineral acid used may be sufficient to lower the pH of the wash water to between about 3 to about 12, alternatively to 10 or below, and in another non-limiting version to 7 or below or even 6 or below. The hydroxyl carboxylic acids (and salts thereof) are expected to be useful over a wide pH range, although in some situations it may be necessary or desirable to adjust the pH to achieve the desired contaminant transfer or separation.

In one embodiment, the hydroxyl carboxylic acids are defined herein as not including or exclusive of acetic acid. Acetic acid has sometimes been used to remove metals as well, but it has high oil solubility and tends to stay with the hydrocarbon coming from the desalter. The acidity of the acetic acid can then cause corrosion problems in the crude unit. The water-soluble hydroxyl carboxylic acids are much more water-soluble and will not partition as much into the crude oil, thus reducing downstream concerns. They are also less volatile and do not distill into the crude unit overhead system where they can increase corrosion rates when combined with the water usually present at this location.

In one non-limiting embodiment, the hydroxyl carboxylic acid is selected from the group consisting of glycolic acid, $C_1$-$C_4$ alpha-hydroxy acids, poly-hydroxy carboxylic acids, thioglycolic acid, chloroacetic acid, polymeric forms of the above hydroxyacids, glycolate ethers, poly-glycolic esters, and mixtures thereof. While thioglycolic acid and chloroacetic acid are not strictly speaking hydroxyl carboxylic acids, they are functional equivalents thereof and are thus included in this definition. The alpha substituent on the $C_1$-$C_4$ alpha-hydroxy acids may be any $C_1$-$C_4$ straight or branched alkyl group. In one non-limiting embodiment, the alpha substituent may be $C_2$-$C_4$ straight or branched alkyl group and lactic acid is not included. Gluconic acid, $CH_2OH(CHOH)_4COOH$, is a non-limiting but preferred polymer of glycolic acid. The glycolate ethers may have the formula:

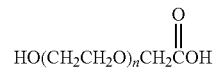

where n ranges from 1-10. The glycolate esters may have a formula:

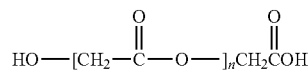

where n is as above. Thioglycolic acid and the ethers of glycolic acid may have the added benefits of a higher boiling point, and possibly increased water solubility. A higher boiling point means the additive will not distill into the distillate fractions in the crude unit and cause corrosion or product quality concerns. The higher water solubility also favors removal of the additive from the crude in the desalter and reduces the amount that may reach the downstream processing units.

In particular, the definition of hydroxyl carboxylic acids includes ammonium salt and alkali metal salts (e.g. sodium and potassium salts, etc.) of these hydroxyl carboxylic acids alone or in combination with the other water-soluble hydroxyl carboxylic acids mentioned. Such salts would be formed in the desalter wash water as the system's pH was adjusted with pH adjusters such as sodium hydroxide, potassium hydroxide, ammonia, and the like.

In another non-limiting embodiment the hydroxyl carboxylic acids do not include citric acid, malic acid, tartaric acid, mandelic acid, and lactic acid. In yet another non-limiting embodiment, the definition of water-soluble hydroxyl carboxylic acids does not include organic acid anhydrides, particularly acetic, propionic, butyric, valeric, stearic, phthalic and benzoic anhydrides.

It will be appreciated that the necessary, effective or desired proportions of the complex blend to be added to a hydrocarbon stream, e.g. crude oil, will be difficult to predict in advance, since these proportions or dosages are dependent upon a number of factors, including, but not necessarily limited to, the nature of the hydrocarbon, the nature of and concentration of metal species to be removed, the temperature and pressure conditions of the method, the particular components and proportions thereof in the blend and whether and how much of a hydroxyl carboxylic acid and/or mineral acid is used, etc. In general, the more of a species, such as iron, there is to be removed, the more of the complex blend that must be added. Since many undesirable species are affected, a successful metal removal process may require more complex blend on a stoichiometric basis than would be indicated by the concentration of only the target species. It may therefore be insufficient to only just add enough acid to get the pH below 12 or one of the other thresholds noted. Nevertheless, in order to give some sense of the proportions that may be used in the solvent stream, in one non-limiting embodiment, (not including any solvent or mineral acid) the amount of complex blend added may range from about 0.1 independently to about 2000 ppm-w, alternatively from about 1 independently to about 1000 ppm-w per ppm metal (e.g. iron), in another non-restrictive version from about 10 independently to about 500 ppm-w per ppm metal to be removed, and will depend on the concentration of metal species to be removed. A slight excess of the complex blend will ensure that the reaction goes to completion. For economic reasons the refinery may chose to leave some of the metal species in the crude at an acceptably low level of contamination of hydrocarbon. In those cases the treatment level of the complex blend may be correspondingly reduced.

It is most preferred, of course, that in the practice of this method there be no oil carryunder in the aqueous phase, and that at least oil carryunder is minimized. Further, while it is preferred that all of the metals transfer to the aqueous phase, in one non-limiting theory, some of the metals may be transferred from the oil phase into the rag. This proportion of metals is then removed when the rag is cleaned out.

It is also most preferred, of course, that in the practice of this method all of the metals transfer to the aqueous phase. In another non-limiting embodiment, 25% or less metal is present in the hydrocarbon phase after desalting, preferably 20% or less metal remains, most preferably only 10% or less remains. In some cases the refinery may chose to leave higher percentages of metal contaminants in the crude if the detrimental effects are judged to be economically acceptable.

The invention will be illustrated further with reference to the following Examples, which are not intended to limit the invention, but instead illuminate it further.

The following Electrostatic Desalting Dehydration Apparatus (EDDA) Test Method was employed to screen possible blend compositions. The EDDA is a laboratory test device to simulate the desalting process.

EDDA Test Method

1. Add a set amount of crude oil to be tested minus the percent of wash water (depending on the number of tubes the EDDA will hold) to a Waring blender.
2. Add the required percentage of wash water to the blender to bring the total volume up to the necessary total volume (typically 800, 600 or 400 mL).
3. Mix at 50% speed (on a Variac mixer) for 30 seconds. The speed can be reduced if the ΔP on the mix valve is low.
4. Pour the mixture into the EDDA tubes to just below the 100 mL line.
5. Place the tubes in the EDDA heating block that is at the desired test temperature (99° C.).
6. Add the desired quantity of demulsifier, in ppm, to each tube. With every test, a blank must be run for comparison purposes.
7. Place the screw top electrode in the tubes and allow the samples to heat for approximately 15 minutes.
8. Tighten the caps and shake each tube 100-200 times and place back in the heating block to reheat for five minutes.
9. Place the electrode cover over the tubes and lock into place. Make sure that there is good contact between the cover and the electrode caps.
10. Set the time for five minutes and run at 1500-3000 volts, depending on the test requirements.
11. At the end of the five minutes, pull the tubes out and check for the percent water drop. Also check the quality of the interface and the quality of the water and record it.
12. Repeat steps 9, 10, and 11 until the desired total residence time is achieved.
13. Determine the best candidates and run a dehydration test on those samples.
    a) Fill the desired number of 12.5 mL centrifuge tubes to the 50% mark with xylene.
    b) Use a glass syringe to pull 5.8 mL of dehydrated crude sample from the desired level in the tube and mix in with the xylene in the centrifuge tubes.
    c) Centrifuge the tubes at 2000 rpm for 4 minutes.
    d) Check for the quantity of water, emulsion, and solids that are present in the bottom of the tube and record.

Analysis for Iron

After completing the EDDA test, use a glass syringe and cannula (long, wide bore needle), to withdraw two 20 mL aliquots of the EDDA desalted crude oil. Abstract the oil at a level in the EDDA tube that is at 50 mL below the surface of the oil. Each sample was analyzed for iron concentration by an appropriate method (wet ash or microwave digestion, acidification, dilution, AA or ICP analysis).

The crude oils used were two different Mid West Refinery oils that have a high iron content. Additive #1 was composed of a) the combination of oxyalkylated formaldehyde phenolic resin and crosslinked alkoxylated polyols (37%); surfactant (8%), acetylacetone (10%), aromatic 100 solvent (45%).

TABLE I

Iron Removal from Crude Using a Complex Blend

| Ex. | Sample Source | Additive (ppm) | Iron (ppm) |
|---|---|---|---|
| 1 | Mid West Refinery oil (#4) | No additive | 22.0 |
| 2 | Mid West Refinery oil (#4) | Additive #1 @ 20 | 4.8 |
| 3 | Mid West Refinery oil (#4) | Additive #1 @ 25 | 4.7 |
| 4 | Mid West Refinery oil (#4) | Additive #1 @ 30 | 4.2 |
| 5 | Mid West Refinery oil (#1) | No additive | 17.0 |
| 6 | Mid West Refinery oil (#1) | Additive #1 @ 20 | 4.5 |
| 7 | Mid West Refinery oil (#1) | Additive #1 @ 25 | 3.7 |

From the data presented in Table I it may be seen that the water-soluble complex blend of Additive #1 effectively removed or transferred iron from the oil phase to the water phase.

In the foregoing specification, the invention has been described with reference to specific embodiments thereof, and has been demonstrated as effective in transferring metals, e.g. iron, from crude oil to the aqueous phase in bench scale desalting testing, as non-limiting examples. However, it will be evident that various modifications and changes can be made thereto without departing from the broader spirit or scope of the complex blend as set forth in the appended claims. Accordingly, the specification is to be regarded in an illustrative rather than a restrictive sense. For example, specific oxyalkylated alkyl resins, crosslinked polypropylene glycols, surfactants, diketones, and proportions and combinations thereof with other hydroxyl carboxylic acids and/or mineral acids, other than those specifically exemplified or mentioned, or in different proportions, falling within the claimed parameters, but not specifically identified or tried in a particular application to transfer metals into the aqueous phase, are within the scope of this inventive blend and methods. Similarly, it is expected that the inventive compositions will find utility as metal transfer compositions for other fluids besides crude oil emulsions.

The words "comprising" and "comprises" as used throughout the claims is interpreted "including but not limited to".

The present invention may suitably comprise, consist or consist essentially of the elements disclosed and may be practiced in the absence of an element not disclosed. For instance, the complex blend may consist of or consist essentially of the oxyalkylated alkyl resins, crosslinked polypropylene glycols, surfactants and diketones as defined in the claims. In another non-limiting embodiment, method of transferring at least one metal from a hydrocarbon phase to a water phase in a refinery desalting process may consist essentially of or consist of, in any order: adding to crude oil, an effective amount of a composition to transfer at least one metal from a hydrocarbon phase to a water phase, and adding a wash water to the crude oil to create an emulsion. Again, the composition may consist essentially of or consist of a blend comprising, consisting essentially of or consisting of at least one oxyalkylated alkyl resin, at least one crosslinked polypropylene glycol, at least one surfactant, and at least one diketone. The method would also consist essentially of or consist of resolving the emulsion into a hydrocarbon phase and an aqueous phase using electrostatic coalescence, where at least a portion of the at least one metal is transferred to the aqueous phase.

What is claimed is:

1. A method of transferring at least one metal from a hydrocarbon phase to a water phase in a refinery desalting process comprising:
   in any order:
      adding to crude oil, an effective amount of a composition to transfer at least one metal from a hydrocarbon phase to a water phase, the composition comprising a blend comprising:
         at least one demulsifier selected from the group consisting of an oxyalkylated alkyl resin, a crosslinked polypropylene glycol and mixtures thereof,
         at least one surfactant,
         at least one diketone chelating agent, and
         at least one solvent;
      adding a wash water to the crude oil to create an emulsion; and
      resolving the emulsion into a hydrocarbon phase and an aqueous phase using electrostatic coalescence in the refinery desalting process, where at least a portion of the at least one metal is transferred to the aqueous phase.

2. The method of claim 1 where in the blend:
   the demulsifier proportion ranges from about 1 to about 50 weight %;
   the surfactant proportion ranges from about 1 to about 20 weight %;
   the diketone chelating agent proportion ranges from about 1 to about 30 weight %; and
   the solvent proportion ranges from about 5 to about 90 weight %.

3. The method of claim 1 where in the blend:
   In the demulsifier:
      the at least one oxyalkylated alkyl resin is selected from the group consisting of t-butyl phenol resins, octyl phenol resins, nonyl phenol resins, dinonyl phenol resins, dodecyl phenol resins, and combinations thereof, which resin has been ethoxylated and/or propoxylated;
      the at least one crosslinked polypropylene glycol is at least one polypropylene glycol crosslinked with a crosslinking agent selected from the group consisting of bis-phenol A, epoxy resins, anhydrides, toluene diisocyanate, and combinations thereof;
   the at least one surfactant is selected from the group consisting of $C_1$-$C_{30}$ ethoxylated fatty acids, oxyalkylated alkyl phenols different from the at least one oxyalkylated alkyl resin, polyoxyethylene glycol sorbitan alkyl esters, sorbitan alkyl esters, glucoside alkyl ethers, and combinations thereof;
   the at least one diketone chelating agent is selected from the group consisting of 2,3-butanedione, diacetyl diketone, acetylacetone, hexane-2,5-dione, and combinations thereof; and
   the at least one solvent is an aromatic solvent.

4. The method of claim 1 further comprising adding to the wash water, the crude oil or the emulsion, an acid selected from the group consisting of hydroxyl carboxylic acids, and mineral acids selected from the group consisting of sulfuric acid, phosphoric acid, water-soluble sulfonic acids, water-soluble phosphonic acids, and combinations thereof.

5. The method of claim 1 where the pH of the wash water is between about 3 to about 12.

6. The method of claim 1 where the amount of blend in the crude oil ranges from about 0.1 to about 2000 ppm-w, based on the crude oil.

7. A method of transferring at least one metal from a hydrocarbon phase to a water phase in a refinery desalting process comprising:
   adding to crude oil, from about 0.1 to about 2000 ppm-w, based on the crude oil of a blend comprising:
      from about 1 to about 50 weight % of at least one demulsifier,
      from about 1 to about 20 weight % of at least one surfactant,
      from about 1 to about 30 weight % of at least one diketone chelating agent, and
      from about 5 to about 90 weight % of at least one solvent;
   adding a wash water to the crude oil to create an emulsion; and
   resolving the emulsion into hydrocarbon phase and an aqueous phase using electrostatic coalescence in the refinery desalting process, where at least a portion of the at least one metal is transferred to the aqueous phase.

8. The method of claim 7 where in the blend:
   in the demulsifier:
      the at least one oxyalkylated alkyl resin is selected from the group consisting of t-butyl phenol resins, octyl phenol resins, nonyl phenol resins, dinonyl phenol resins, dodecyl phenol resins, and combinations thereof, which resin has been ethoxylated and/or propoxylated;
      the at least one crosslinked polypropylene glycol is at least one polypropylene glycol crosslinked with a crosslinking agent selected from the group consisting of bis-phenol A, epoxy resins, anhydrides, toluene diisocyanate, and combinations thereof;

the at least one surfactant is selected from the group consisting of $C_1$-$C_{30}$ ethoxylated fatty acids, oxyalkylated alkyl phenols different from the at least one oxyalkylated alkyl resin, polyoxyethylene glycol sorbitan alkyl esters, sorbitan alkyl esters, glucoside alkyl ethers, and combinations thereof;

the at least one diketone chelating agent is selected from the group consisting of 2,3-butanedione; diacetyl diketone, acetylacetone, hexane-2,5-dione, and combinations thereof; and the at least one solvent is an aromatic solvent.

9. The method of claim 7 further comprising adding to the wash water, the crude oil or the emulsion an acid selected from the group consisting of hydroxyl carboxylic acids, and mineral acids selected from the group consisting of sulfuric acid, phosphoric acid, water-soluble sulfonic acids, water-soluble phosphonic acids, and combinations thereof.

10. The method of claim 7 where the pH of the wash water is between about 3 to about 12.

11. A composition for transferring at least one metal from a hydrocarbon phase to a water phase comprising a blend comprising:
   at least one demulsifier selected from the group consisting of oxyalkylated alkyl resin, at least one crosslinked polypropylene glycol, and
   mixtures thereof;
   at least one surfactant,
   at least one diketone chelating agent, and
   at least one solvent.

12. The composition of claim 11 where in the blend:
   the demulsifier proportion ranges from about 1 to about 50 weight %;
   the surfactant proportion ranges from about 1 to about 20 weight %;
   the diketone chelating agent proportion ranges from about 1 to about 30 weight %; and
   the solvent proportion ranges from about 5 to about 90 weight %.

13. The composition of claim 11 where in the blend:
   in the demulsifier:
      the at least one oxyalkylated alkyl resin is selected from the group consisting of t-butyl resins, octyl resins, nonyl resins, dinonyl resins, dodecyl phenol resins, and combinations thereof, which resin has been ethoxylated and/or propoxylated;
      the at least one crosslinked polypropylene glycol is at least one polypropylene glycol crosslinked with a crosslinking agent selected from the group consisting of bis-phenol A, epoxy resins, anhydrides, toluene diisocyanate, and combinations thereof;
   the at least one surfactant is selected from the group consisting of $C_1$-$C_{30}$ ethoxylated fatty acids, oxyalkylated alkyl phenols different from the at least one oxyalkylated alkyl resin, polyoxyethylene glycol sorbitan alkyl esters, sorbitan alkyl esters, glucoside alkyl ethers, and combinations thereof;
   the at least one diketone chelating agent is selected from the group consisting of 2,3-butanedione, diacetyl diketone, acetylacetone, hexane-2,5-dione, and combinations thereof; and
   the at least one solvent is an aromatic solvent.

14. A treated crude oil emulsion consisting of:
   crude oil;
   a composition for transferring at least one metal from a hydrocarbon phase to a water phase comprising a blend comprising:
      at least one demulsifier selected from the group consisting of oxyalkylated alkyl resin, at least one crosslinked polypropylene glycol, and mixtures thereof,
      at least one surfactant,
      at least one diketone chelating agent, and
      at least one solvent; and
   wash water.

15. The treated crude oil emulsion of claim 14 where in the blend:
   the demulsifier proportion ranges from about 1 to about 50 weight %;
   the surfactant proportion ranges from about 1 to about 20 weight %;
   the diketone proportion ranges from about 1 to about 30 weight %; and
   the solvent proportion ranges from about 5 to about 90 weight %.

16. The treated crude oil emulsion of claim 14 where in the blend:
   in the demulsifier:
      the at least one oxyalkylated alkyl resin is selected from the group consisting of t-butyl resins, octyl resins, nonyl resins, dinonyl resins, dodecyl phenol resins, and combinations thereof, which resin has been ethoxylated and/or propoxylated;
      the at least one crosslinked polypropylene glycol is at least one polypropylene glycol crosslinked with a crosslinking agent selected from the group consisting of bis-phenol A, epoxy resins, anhydrides, toluene diisocyanate, and combinations thereof;
   the at least one surfactant is selected from the group consisting of $C_1$-$C_{30}$ ethoxylated fatty acids, oxyalkylated alkyl phenols different from the at least one oxyalkylated alkyl resin, polyoxyethylene glycol sorbitan alkyl esters, sorbitan alkyl esters, glucoside alkyl ethers, and combinations thereof; and
   the at least one diketone is selected from the group consisting of 2,3-butanedione; diacetyl diketone, acetylacetone, hexane-2,5-dione, and combinations thereof.

17. The treated crude oil emulsion of claim 14 where the pH of the wash water is between about 3 to about 12.

18. The treated crude oil emulsion of claim 14 where the amount of blend in the crude oil ranges from about 0.1 to about 2000 ppm-w, based on the crude oil.

19. The treated crude oil emulsion of claim 15 where the crude oil contains more than 10 ppm iron.

* * * * *